United States Patent
Wloszek

[11] 3,777,553
[45] Dec. 11, 1973

[54] SUPPORT FOR TEST HEAD

[75] Inventor: Joseph T. Wloszek, Seven Hills, Ohio

[73] Assignee: Custom Machine, Inc., Cleveland, Ohio

[22] Filed: Jan. 22, 1971

[21] Appl. No.: 108,853

[52] U.S. Cl. .............................................. 73/71.5 U
[51] Int. Cl. .......................................... G01n 29/00
[58] Field of Search.................. 73/67.5, 67.7, 67.8, 73/67.8 S, 71.5; 324/37, 61 P

[56] References Cited
UNITED STATES PATENTS
3,531,575   9/1970   Kobler et al. ......................... 274/4 C
3,121,325   2/1964   Rankin et al. ...................... 73/67.8 S FOREIGN PATENTS OR APPLICATIONS
657,460   12/1964   France ................................. 73/71.5
619,826   4/1927   France............................... 324/61 P

*Primary Examiner*—Richard C. Queisser
*Assistant Examiner*—Arthur E. Korkosz
*Attorney*—Meyer, Tilberry & Body

[57] ABSTRACT

A mounting for the sensing head of a precision testing machine which enables the head to freely move and orient itself relative to the surface of a workpiece. Spaced parallel lengths of an elongated elastic member are fastened at the ends to a supporting frame. The head in engagement with the workpiece is cradled between the middle portions of the elastic members and can move freely up, down, or laterally in both horizontal directions.

13 Claims, 2 Drawing Figures

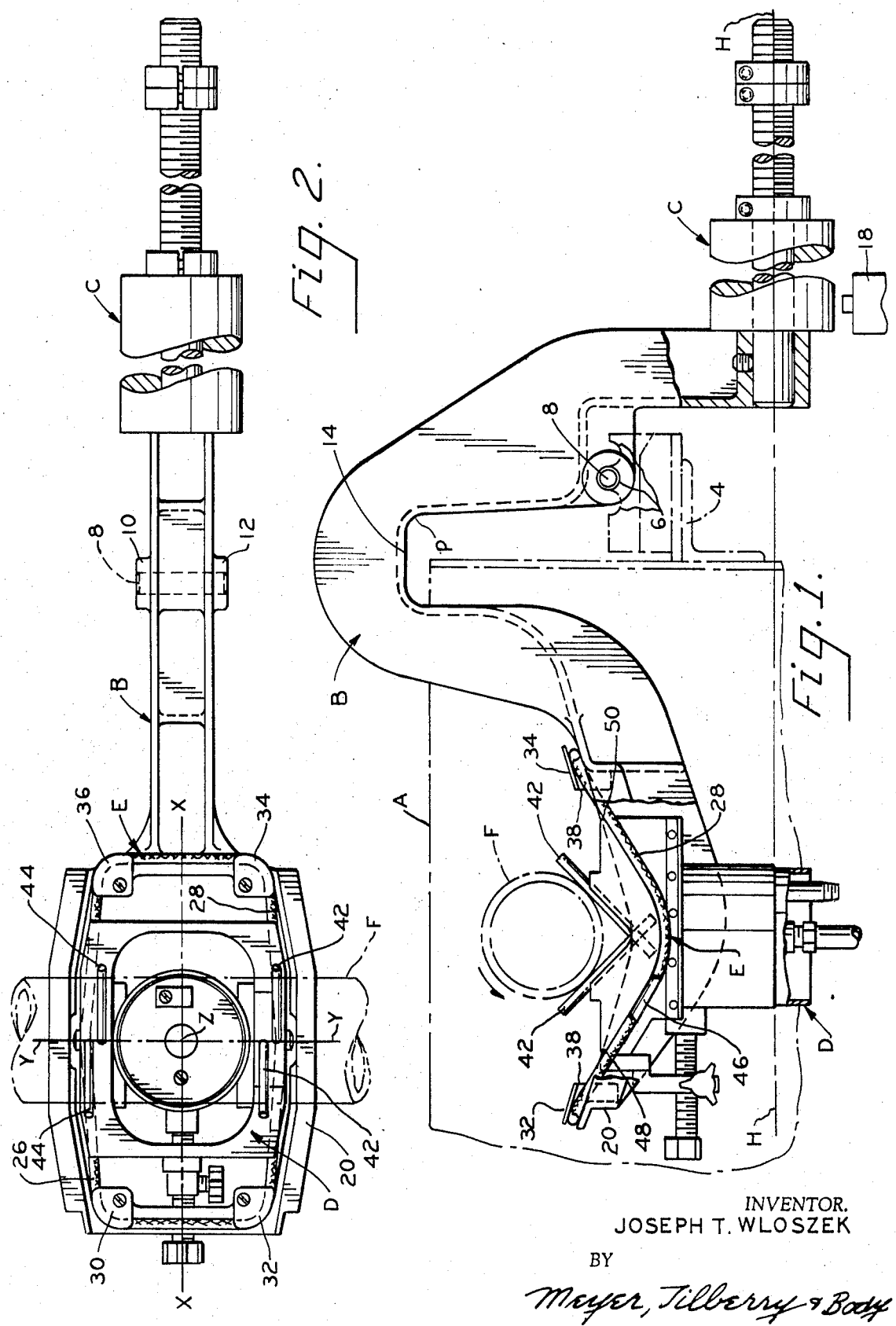

SUPPORT FOR TEST HEAD

This invention pertains to the art of testing of materials, and more particularly to a support for a test head which must be properly oriented relative to the surface of a stationary or movable workpiece to be inspected.

The invention is particularly applicable to the art of ultrasonic testing and will be described with particular reference thereto although the invention is equally applicable to other test situations where a sensing head must be accurately oriented to a workpiece surface either moving or stationary.

In the art of ultrasonic tube testing, it is conventional to rotate simultaneously and move a tube axially past test head. This head must be held in engagement with and accurately oriented relative to the side of the tube. If the tube is not exactly straight, it is necessary that the head move sideways or vertically, or both, to conform to variations in the position of the tube as it moves through the testing machine. Prior art devices have provided various ways of supporting the head for such movement. Some of these prior art devices include gimbal rings, and other rather sophisticated mechanical devices, all of which are quite expensive, tend to wear excessively, especially in the bearings which must be relatively free from friction and therefore are not very strong; moreover, such devices must often operate submerged in water, which means that the many finely machined surfaces, such as bearings and other parts which are really precision parts, are subject to corrosion.

SUMMARY OF THE INVENTION

In accordance with the invention, the test head is cradled between the ends of an elongated elastic member having a low spring rate which member is in turn fastened at its ends to a frame movable towards the workpiece which may be stationary, or moving longitudinally, and/or rotating. Preferably, a pair of such elastic members are provided in spaced parallel relationship and the test head is positioned between and rests on the mid-portions of such members. The elastic member preferably is made from "shock cord" although coiled metallic springs could be used. Further in accordance with the invention, the frame is pivotally supported and is biased toward the workpiece by a counterbalance weight.

It is accordingly an object of this invention to provide a new and improved support for test head which overcomes all of the difficulties referred to above as well as some which have not been detailed.

It is a further object of the invention to provide such a support which is simple in construction, inexpensive to build, and which is easily and quickly replaced without a high degree of skill being exercised.

Another object of the invention is the provision of a new and improved support for a test head wherein the head is cradled between the ends of one or more elongated elastic members having a low spring rate such that the head is free to move in all directions to conform to the surfaces of a workpiece.

The invention may take physical form in certain parts and arrangements of parts, a preferred embodiment of which will be described in detail in this specification and illustrated in the accompanying drawings which form a part hereof and wherein:

FIG. 1 is a side elevation view of a portion of a testing device which embodies the invention disclosed and claimed in this case; and, FIG. 2 is a top plan view of the mechanism shown in FIG. 1.

DESCRIPTION

Referring now to the drawings wherein the showings are for the purposes of illustrating a preferred embodiment of the invention only and not for the purposes of limiting same, the FIGURES show a workpiece F moving horizontally past a test station comprised of a test head D supported resiliently for universal movement by an elastic member E, on an arm B pivotally supported on the side of a tank A. On the outside of the tank, a counterweight C acts to bias the arm B and head D toward the workpiece F.

The workpiece F is shown as a tube. Obviously it could be solid, or a member having a flat surface. Also the workpiece can be stationary or moving longitudinally or rotating or both. In the preferred embodiment it is both rotated and moved axially.

Shown in phantom in FIG. 1 are the outlines of a tank A which is part of the testing environment, tank A being adapted to contain water or other liquid useful in the testing operation. In the embodiment shown, a suitable bracket 4 on the outside of the tank provides a plurality of pivot recesses 6, any one of which may receive and hold a pivot pin 8, pin 8 being secured at its ends in a pair of bosses 10 and 12 so that the portion of pin 8 between its ends is exposed and is available to engage one of the pivot recesses 6 referred to above. Bosses 10 and 12 are formed integral with and are carried by aforesaid arm B.

Arm B is an elongated member in the form of an inverted U at 14 intermediate its ends to receive the adjacent edge of tank A so that the test head D may be submerged and so that counterweight C may be approximately aligned with the test head, as shown by axis H—H in FIG. 1. As there shown, the test head and the counterweight can be intersected by a horizontal plane, through axis H—H, when the arm is in testing position. Counterweight C is threadedly adjustably mounted on the end of arm B which extends outside the tank A. Motor means, such as a conventional pneumatic cylinder 18, will preferably be positioned in such a way as to allow the operator of the machine to pivot the arm B about its pivot pin 8.

The end of arm B opposite counterweight C is provided with a cradle 20 to hold head D. In the embodiment shown, cradle 20 is simply an open rectangular frame having an opening of a size to freely receive test head D. The frame holds elastic member E in such a way that two parallel lengths, namely the lengths shown at 26 and 28, are exposed when the cradle does not hold a test head. Moreover, the two lengths 26 and 28 are spaced apart so that test head D may fit in the space between the lengths 26 and 28.

More specifically, cradle 20 carries, at the corners of the rectangle, four grooved elements 30, 32, 34 and 36. Each of the grooved elements just enumerated carries at its outer edge a groove 38, best seen in the elements 32 and 34 as shown in FIG. 1. The four corner means 30, 32, 34, 36 on cradle 20 to support member E can be said for reference purposes to constitute means on the cradle to engage the member E at a plurality of points which define a first support axis shown at X—X in FIG. 2. The member E is preferably a length of one quarter inch "shock cord" joined at its ends by suitable connectors and looped around the four corner means.

Other size cords can be used. Such an elastic member has the necessary high spring rate, is light in weight, and economical.

Test head D is supported in cradle 20 by elastic member E so as to have universal movement relative to cradle 20 and, what is more important, relative to the workpiece which is shown at F. It will be understood that test head D may be any one of a number of test devices which are commercially available for a purpose such as that outlined in this case. In the test machine actually constructed to embody this invention, test head D is an ultrasonic device which is provided at its upper surface as seen in FIG. 1 with two pairs of rods 42 and 44 of hardened steel. The two pairs 42 and 44 are spaced apart and mounted on opposite sides of the test head to engage and locate the head relative to the workpiece surface. Each pair is arranged to form a V or trough to engage the member F. Obviously rollers could be provided and if the surface of the workpiece is flat, the rollers or bars would be in a plane. The head itself has a member (not shown) which must engage the surface with proper orientation.

Test head D is provided with means to rest on the elastic member E for support while the head is in operating position in the cradle. For that purpose, the test head is provided at each side with a downwardly facing arcuate groove 46 which fits over the elastic members 26, 28. Together, the two grooves constitute downward-facing support means on head D. The grooves 46 have a curved longitudinal contour such that when resting on the members 26, 28, the surface of the groove generally at its midpoint engages the members 26, 28 and then the surface and the members diverge slightly. As downward pressure is placed on the head D, the members 26, 28 stretch slightly and contact a greater arc on the grooves. If a lateral force is applied to the head D, one portion of the member can stretch while the other contracts or the groove and members can slip relative to one another or both. The contour of groove 46 should be such that the head can rock slightly while suspended on the member E and at points 48 and 50, flexible member E will encounter smooth, rounded edges, rather than sharp or knife edges. The purpose of such rounded edges is twofold: (1) Avoid damage to flexible member E; and (2). Offer a minimum of resistance to sliding of member E in the groove.

Another consideration in the design of groove 46 is that the two lengths 26 and 28 of flexible member E have sufficient droop to permit test head D freedom to swing in cradle 20 in somewhat the same manner that a hammock swings on its supports.

The means on head D to engage member E for support of the head in its operating position engage the member at a plurality of points which define a second support axis Y—Y. The first support axis X—X and the second support axis Y—Y intersect at a point marked Z in FIG. 2. It will be further apparent that the point of intersection Z lies between the cradle engagement points with the member and between the head engagement points with the member.

Grooves 46 in the test head are preferably smooth and the elastic member E has a sliding engagement with the head in the grooves. The test head D accordingly is free to shift longitudinally relative to arm B because of the sliding engagement between elastic member E and head D, and is also free to swing transversely of the arm in a manner similar to hammock. These two characteristics give the head D a universal freedom that is over and above the freedom it has because of the resilience of the elongated elastic member E.

Cylindrical workpiece F moves along a path that is substantially parallel to the cylindrical axis of the workpiece, namely a path which is perpendicular to the plane of the paper of FIG. 1. As the workpiece F thus moves along its path, it is engaged at its underside by the rods 42 and 44. Such engagement is a sliding engagement of the rods with the workpiece which always locates the workpiece a given distance from the test head and provides the environmental uniformity needed in a testing operation. The signal output from the test head goes to suitably calibrated instruments.

Test head D is biased into engagement with workpiece F by arm B which carries the test head and is counterweighted at its outer end by the weight C described above and shown in both FIGURES of the drawings. The position of the counterweight will be adjusted by the machine operator to provide the desired bias of the test head into engagement with the workpiece. When workpiece F is simply being moved through the test tank A and is not acutally being subjected to a test reading by the test head, it will of course be desirable to have the test head D out of engagement with workpiece F. To disengage the test head from the workpiece, the test operator actuates a suitable control valve which admits air to the pneumatic cylinder 18, causing the cylinder to extend its actuator and engage a portion of arm B, here shown as the counterweight C, to pivot arm B counterclockwise about its pivot pin 8, and disengage test head D from the workpiece F. During such traverse of the workpiece through the test machine, arm B is held against a "stop" position by the point $p$ in the U of arm B engaging the adjacent edge of tank A. Arm B holds said "stop" position as long as the test operator keeps air under pressure on pneumatic cylinder 18. When the control valve for cylinder 18 is returned to its "off" position and air is vented from the cylinder, arm B returns to its position of contact with workpiece F as shown in FIG. 1. Damage which might otherwise be caused to the test head by a sudden jarring contact of rods 42, 44 with the workpiece is avoided in the machine shown by the resilience of elastic member E.

It will be apparent to those skilled in the art that member E supports head D in such a way as to give the test head three degrees of freedom of movement. In other words, test head D is free to move in any direction to accommodate irregularities in the workpiece as these are encountered by the pairs of rods 42 and 44, maintaining a uniform distance between the workpiece and the test head. Such movement is not limited to what is possible because of the resilience of member E: head D is slidable on member E in the X—X direction (FIG. 2) because of smooth grooves 46; is swingable like a hammock in the Y—Y direction because of the droop (FIG. 1) of lengths 26 and 28 of member E and because of the flexibility of member E; and is movable vertically because arm B is substantially balanced on the axis of pin 8.

Member E must have a size, strength and elasticity best suited for the particular application involved in any given situation. Thus, member E is preferably of rubber enclosed in a braided nylon covering, known commercially as "shock cord."

However, materials other than shock cord can be used. A helical metal spring might be better than shock cord in some applications. A principal desired characteristic of the resilient member is a low spring rate, so that yielding of the test head does not require a large force.

The invention has been described with reference to the preferred embodiment. Obviously modifications and alterations will occur to others upon the reading and understanding of this specification. It is my intention to include all such modifications and alterations insofar as they come within the scope of the appended claims or the equivalence thereof.

What is claimed is:

1. Means to support an ultrasonic test head for universal movement to facilitate alignment of said head with the surface of a workpiece, said support means comprising: an open frame having means for locating a test head support mounting member thereto; at least one elongated elastic mounting member affixed to said locating means to extend generally across and downwardly of said open frame, said test head including means adapted for engaging said at least one member at generally the midportion thereof whereby said head is supported within said open frame in a cradle-like manner, said at least one member providing the sole support for said test head in said frame, said elastic mounting member comprising a pair of elastic members disposed in a spaced-apart, generally parallel relationship to each other, and said test head being supportingly received at generally the midportions of said pair of elastic members.

2. Test head support means as in claim 1, wherein said pair of elastic members comprise portions of a single continuous loop of elastic material.

3. Test head support means as in claim 2, wherein said frame is generally rectangular, said locating means comprising loop retaining members disposed adjacent the corners of said frame, said loop of elastic material extending around said loop retaining members for retention thereof relative to said frame.

4. Test head support means as in claim 3, wherein said test head engaging means comprises a pair of downwardly facing arcuate grooves, said grooves each engaging one of said portions of said elastic material at generally the midportions thereof.

5. Means to support a test head for universal movement, said support means comprising: a support arm; means for providing a generally horizontal pivot axis for the arm; a cradle carried by the arm on one side of said axis, said cradle including means thereon for locating elongated flexible members in a spaced apart relationship from each other to extend generally transversely across said cradle; means on said head for engaging said flexible members at generally the midportions thereof for support of the head by the cradle; and, means for counterbalancing said arm about said axis.

6. Means as in claim 5, wherein the arm is elongated and has two ends, the cradle being carried at one end, said counterbalancing means comprising a counterweight at the other end of the arm, said pivot axis being generally intermediate said two ends.

7. Means as in claim 6, a tank having a plurality of walls to contain a liquid, and means on one wall of the tank to support the means to provide a pivot axis.

8. Means as in claim 7, wherein said arm is shaped intermediate its ends in the form of an inverted U.

9. Means as in claim 5, a tank having a plurality of walls to contain a liquid, and means on one wall of the tank to provide a pivot axis for said arm.

10. Means as in claim 9, wherein said arm is shaped intermediate its ends in the form of an inverted U.

11. An arrangement for supporting a test head in engagement with a workpiece comprising; support means including at least a pair of spaced-apart support points, an elastic shock cord freely extending between said support points, a test head having a downwardly facing support surface thereon resting on said shock cord and freely suspending said test head on said shock cord, said test head being movable relative to and along said shock cord between said support points.

12. The device of claim 11 wherein said support surface is longitudinally outwardly arcuate in a direction parallel to a line connecting said support points.

13. The device of claim 12 wherein said shock cord is stretched downwardly to a predetermined curvature with said test head suspended thereon and said support surface has a curvature substantially corresponding with said predetermined curvature.

* * * * *